Dec. 14, 1926.

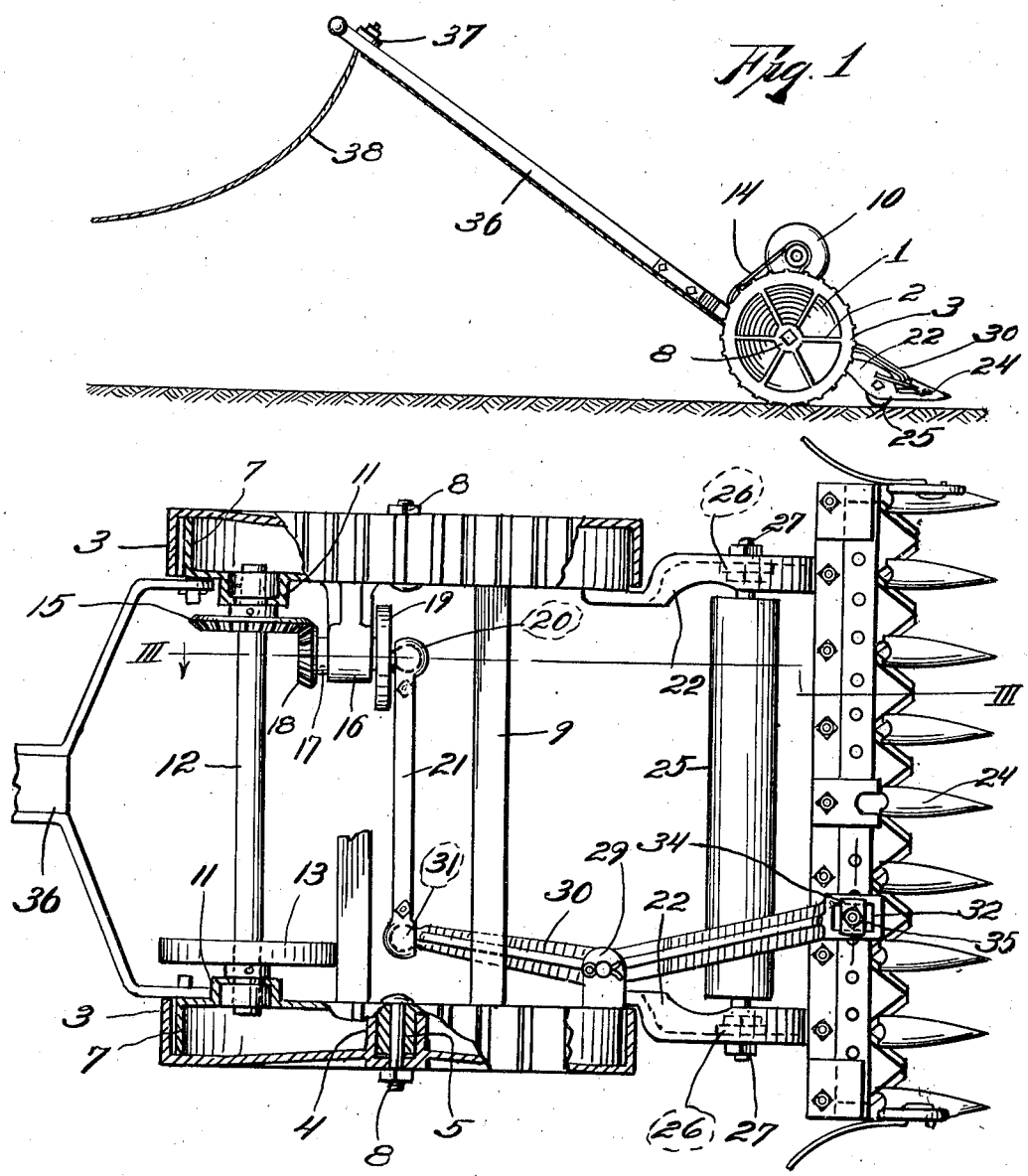

W. DUCKETT

POWER MOWER

Filed Oct. 22, 1923  2 Sheets-Sheet 2

1,610,498

Inventor:
William Duckett
By Thorper Gerard
Attys.

Witness:
R. E. Hamilton

Patented Dec. 14, 1926.

1,610,498

UNITED STATES PATENT OFFICE.

WILLIAM DUCKETT, OF WICHITA, KANSAS.

POWER MOWER.

Application filed October 22, 1923. Serial No. 669,968.

This invention relates to reciprocatory power mowers and has for one of its objects to produce a small and compact mower of the type mentioned which can be used in mowing lawns and the like regardless of the height of grass or weeds.

It has been found that the ordinary type of rotary mower for lawns will not function properly after the grass has been permitted to attain a height of four or five inches, or higher, as the blades of such a mower will, under these conditions, merely knock and press down the grass.

Another object is to produce a mower of the type mentioned which is of strong, durable, efficient and relatively inexpensive construction; and in order that it may be fully understood, reference is to be had to the accompanying drawings, in which:—

Figure 1 is a side elevation of a mower embodying the invention.

Figure 2 is an enlarged top plan view of the mower, partly broken away to disclose parts otherwise hidden.

Figure 3:
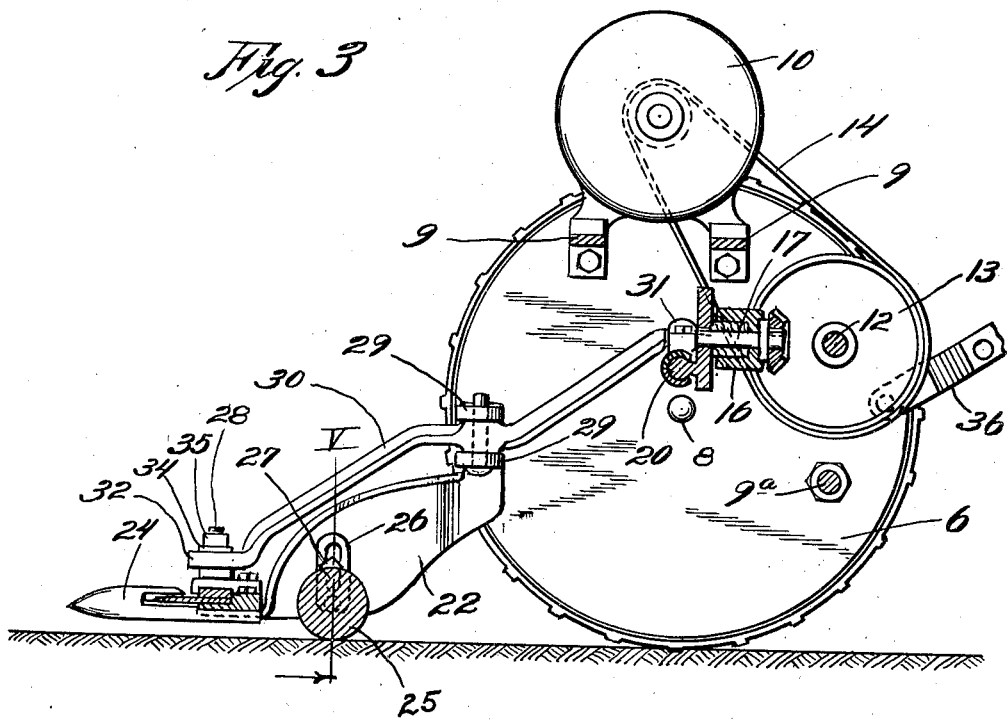
Figure 3 is a section on the line III—III of Figure 2.
Figure 4:
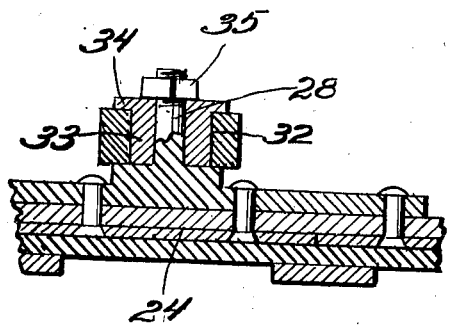
Figure 4 is an enlarged fragmentary section longitudinally of the cutter bar mechanism.
Figure 5:
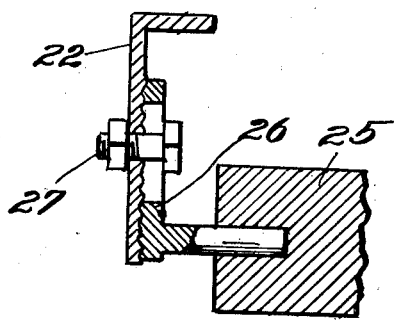
Figure 5 is an enlarged section on the line V—V of Figure 3.

In the said drawings, where like reference characters identify corresponding parts in all of the figures, 1 represents a pair of disk wheels of slightly concave character and formed with suitable stiffening ribs 2. The peripheries of the disk wheels are inturned to provide flanged tread portions 3, and are also provided centrally with enlarged hubs 4 for the reception of a projecting bearing or hub portion 5 formed on internal disk members 6 formed with flange portions 7 received within the treads 3 of the external members of the wheels, said wheels being secured together by means of bolts and nuts 8. It will be evident from the construction described that the external members are free for turning movement with the hubs of the internal members as the axes, and that the internal members are also free for independent rotation or movement, as will hereinafter appear.

The internal disks are rigidly secured together by means of a pair of strap members 9 located near the tops of the wheels, and by a brace rod 9ª located at any suitable point. The straps 9 act as a supporting base for any suitable source of power, and as illustrated support a suitable driving electric motor 10, although it will be apparent that an internal combustion motor may be employed if found preferable.

Projecting inwardly from the disks 6 and in alinement with each other are bosses 11 providing journals for the opposite ends of a horizontal shaft 12. Keyed on and near one end of said shaft 12 is a driving belt wheel 13 adapted to be driven by the motor 10 through the instrumentality of a belt 14, and keyed upon and near the opposite end of said shaft 12 is a beveled driving gear 15. Projecting inwardly from one of the disks 6 is a bearing arm 16 in which is journaled a short shaft 17 having at one end a beveled gear wheel 18 in mesh with the gear 15, and at its other end said shaft is provided with a plate 19 having an eccentric ball and socket connection 20 with one end of a connecting rod 21.

The cutting mechanism of the mower is supported by a pair of forwardly projecting arms 22, each of said arms being preferably cast integrally with one of the disks 6. The outer ends of said arms are rigidly secured to any suitable or desirable form of reciprocating cutter 24 of a conventional mower mechanism, not described in detail as forming no part of this invention. In order to support the cutter to allow for varying heights of cut, a transverse roller 25 is journaled between the arms 22 and adjustably carries the weight of said arms and cutter bar by means of slotted brackets 26 adjustably clamped to the arms 22 by means of bolts 27 as common in the art.

The cutting blade of the mower mechanism is formed integrally with an upstanding stud bolt 28. Pivoted between a pair of inwardly extending ears 29 carried by one of the arms 22 is an oscillating lever 30 having at its inner end a ball and socket connection 31 with the adjacent end of the connecting link 21, and being formed at its other end with a rectangular opening or slot 32 receiving the reduced portion 33 of a flanged collar 34, the members being secured in fixed position on the stud bolt 28 by means of a nut 35, it being apparent in this connection that the flange of the collar 34 will prevent accidental dislodgement of the end of the lever, and that the rectangular opening or slot will provide sufficient play to permit of the reciprocation of the cutting blade.

In order to propel the machine, a bifurcated handle 36 is secured to the disks 6 near the rear peripheries thereof, it being understood that the weight of the cutting bar and connections is sufficient to overbalance the weight of the handle around the hubs of the wheels as centers, to maintain the roller 25 in contact with the ground and the machine, therefore, in an upright position. Mounted on the handle 36 in convenient position for operation by the user of the mower is a motor controlling switch 37 in circuit with a suitable flexible current supply conductor 38 and the motor 10, as will be readily understood. It will be apparent that the controlling connections for the motor of an internal combustion engine may also be readily mounted on the handle 36 should it prove desirable to employ a gasoline motor for the reciprocation of the cutting blade of the mower.

In the use of the device, it will be apparent that the operator will start the electric motor for the reciprocation of the cutting blade and will then manually propel the mower across the ground. When an obstruction is encountered and it is desired to elevate the cutter bar, the operator of the machine will merely impose his weight downward on the handle which will cause the inner disks 6 to rotate on the outer or supporting disks 2 and bring about upward swinging movement of the cutter bar 24 to the desired height to pass the obstruction. When the downward pressure on the handle is released the weight of the forward end of the machine will swing the whole downwardly until the roller 25 is again in contact with the ground.

From the above description it will be apparent that I have produced a mower which possesses all of the features of advantage set forth as desirable, and while I have described and illustrated the preferred embodiment of the same, I reserve the right to make all changes properly falling within the spirit and scope of the appended claim.

I claim:

In a power mower, a pair of supporting wheels, rigidly connected disks journaled on and disposed within said wheels, a motor mounted on the rigid connection of the disks, a transverse shaft journaled at its ends in the disks rearward of their axes, means for transmitting power from the motor to said shaft, a bearing bracket projecting from one of the disks forward of the first-named shaft, a short shaft journaled in said bracket and geared to the first-named shaft, a plate on the end of said short shaft provided with a wrist-pin, arms projecting forwardly from the disks, a reciprocatory cutting mechanism extending transversely of and carried by and extending outwardly beyond said arms, a transverse roller between and journaled in said arms and disposed rearward of the cutting mechanism, a lug projecting from the front portion of the disk at the opposite side of the machine from said bearing bracket, a lever mounted on said lug and pivotally and slidingly connected to the reciprocatory part of the cutting mechanism, a transverse link having a ball-and-socket connection at one end with the said wrist-pin and at the other end with the rear end of said lever, a handle secured to the rear portion of the said disks, a flexible power lead to the motor, and a switch on said handle for the control of the motor.

In witness whereof I hereunto affix my signature.

WILLIAM DUCKETT.